(12) United States Patent
Ji et al.

(10) Patent No.: US 9,777,805 B1
(45) Date of Patent: Oct. 3, 2017

(54) PLANETARY GEAR TRAIN OF AUTOMATIC TRANSMISSION FOR VEHICLES

(71) Applicant: HYUNDAI MOTOR COMPANY, Seoul (KR)

(72) Inventors: Seongwook Ji, Gunpo-si (KR); Seong Wook Hwang, Gunpo-si (KR); Hyun Sik Kwon, Seoul (KR); Ki Tae Kim, Incheon (KR); Wonmin Cho, Hwaseong-si (KR); Jae Chang Kook, Hwaseong-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days.

(21) Appl. No.: 15/370,414

(22) Filed: Dec. 6, 2016

(30) Foreign Application Priority Data

Sep. 12, 2016 (KR) .................. 10-2016-0117357

(51) Int. Cl.
*F16H 3/66* (2006.01)

(52) U.S. Cl.
CPC ....... *F16H 3/66* (2013.01); *F16H 2200/0069* (2013.01); *F16H 2200/2012* (2013.01); *F16H 2200/2046* (2013.01)

(58) Field of Classification Search
None
See application file for complete search history.

(56) References Cited

U.S. PATENT DOCUMENTS

| | | | |
|---|---|---|---|
| 2007/0202983 A1* | 8/2007 | Gumpoltsberger | F16H 3/66 475/278 |
| 2009/0209388 A1* | 8/2009 | Carey | B60K 17/046 475/276 |
| 2012/0149525 A1* | 6/2012 | Gumpoltsberger | F16H 3/66 475/275 |
| 2014/0274546 A1* | 9/2014 | Mellet | F16H 3/62 475/275 |
| 2016/0169332 A1* | 6/2016 | Cho | F16H 3/66 475/278 |
| 2016/0169343 A1* | 6/2016 | Cho | F16H 3/66 475/275 |

* cited by examiner

*Primary Examiner* — Justin Holmes
(74) *Attorney, Agent, or Firm* — Brinks Gilson & Lione

(57) ABSTRACT

The present disclosure provides a planetary gear train of an automatic transmission for a vehicle having advantages of improving power delivery performance and fuel economy by achieving at least ten forward speed stages and one reverse speed stage. The planetary gear train may include: first, second, third, and fourth planetary gear sets disposed on the same axis; an input shaft; an output shaft; eight rotation shafts connected to at least one of rotation elements of the first, second, third, and fourth planetary gear sets; four clutches and two brakes that are control elements; and a transmission housing. Torque input from the input shaft is changed by cooperation of the first, second, third, and fourth planetary gear sets, and the changed torque is output through the output shaft.

10 Claims, 2 Drawing Sheets

FIG. 2

Figure 1:
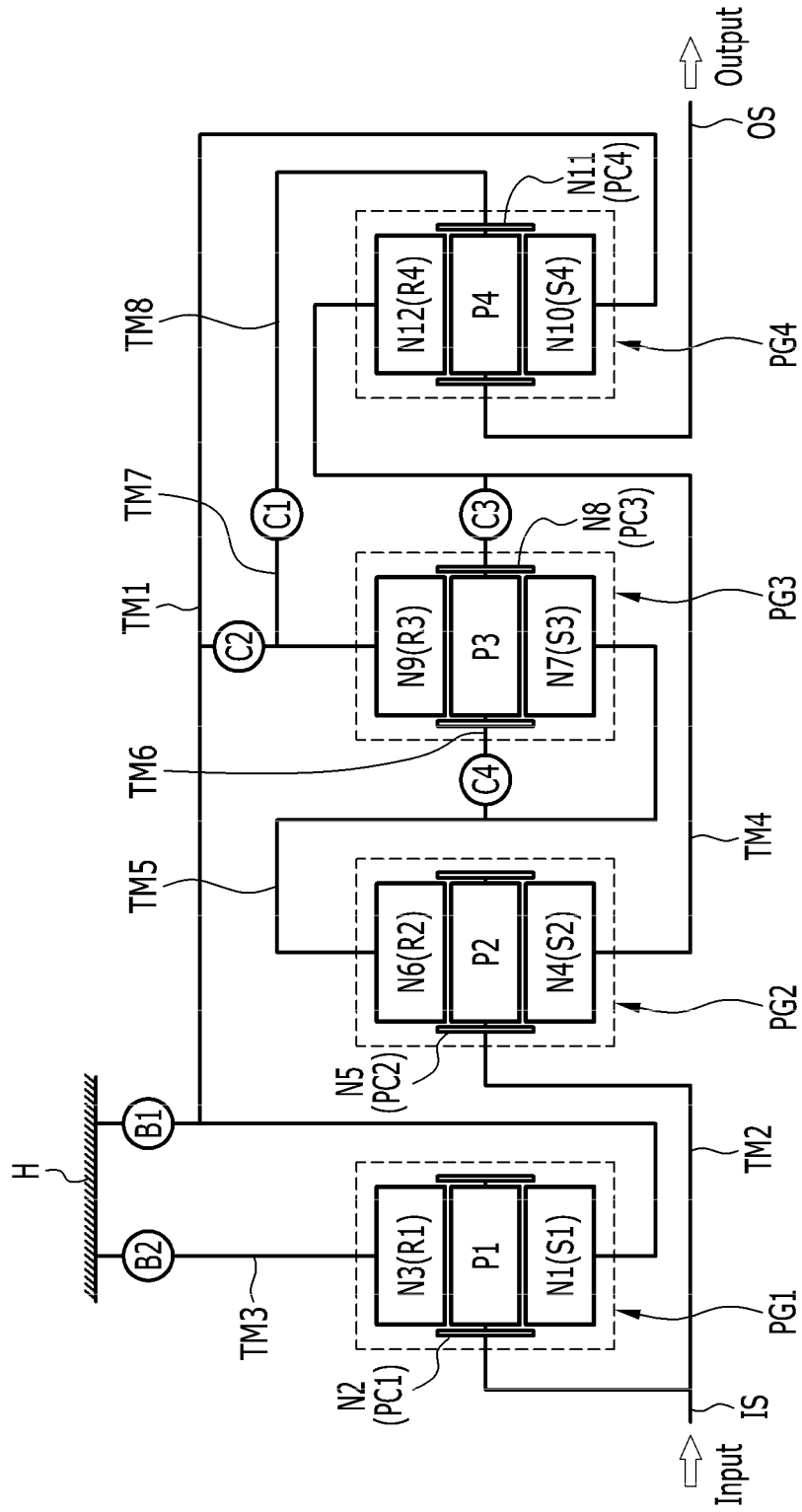

| Speed stages | C1 | C2 | C3 | C4 | B1 | B2 | Gear ratio |
|---|---|---|---|---|---|---|---|
| D1 |  | ● | ● |  | ● |  | 4.103 |
| D2 | ● |  | ● |  | ● |  | 2.466 |
| D3 |  |  | ● | ● | ● |  | 1.556 |
| D4 | ● |  |  | ● | ● |  | 1.192 |
| D5 | ● |  | ● | ● |  |  | 1.000 |
| D6 | ● |  |  | ● |  | ● | 0.806 |
| D7 |  |  | ● | ● |  | ● | 0.651 |
| D8 | ● |  | ● |  |  | ● | 0.529 |
| D9 |  | ● | ● |  |  | ● | 0.469 |
| D10 | ● | ● |  |  |  | ● | 0.400 |
| REV |  | ● |  | ● |  | ● | -3.373 |

PLANETARY GEAR TRAIN OF AUTOMATIC TRANSMISSION FOR VEHICLES

CROSS-REFERENCE TO RELATED APPLICATION

This application claims priority to and the benefit of Korean Patent Application No. 10-2016-0117357, filed on Sep. 12, 2016, the entire contents of which are incorporated herein by reference.

FIELD

The present disclosure relates to an automatic transmission for a vehicle. More particularly, the present disclosure relates to a planetary gear train of an automatic transmission for a vehicle that improves power delivery performance and fuel economy.

BACKGROUND

The statements in this section merely provide background information related to the present disclosure and may not constitute prior art.

Generally, an automatic transmission achieving more speed stages has been developed to enhance fuel economy and optimize drivability. Recently, increase of oil price is triggering a hard competition in enhancing fuel consumption of a vehicle.

Therefore, many researches for reducing weight and enhancing fuel economy through downsizing of an engine and for securing drivability and fuel economy through multiple speed stages of automatic transmissions have been developed.

However, in the automatic transmission, as the number of speed stages increase, the number of internal components (particularly, planetary gear sets) increase, and as a result, a length of the transmission increases. Therefore, mountability, cost, weight, transmission efficiency, and the like may still deteriorate.

In this aspect, in recent years, 8-speed automatic transmissions tend to be implemented and the research and development of a planetary gear train capable of implementing more speed stages has also been actively conducted.

However, a conventional 8-speed automatic transmission typically includes three to four planetary gear sets and five to seven control elements (frictional elements). In this case, since the length of the automatic transmission increases, mountability may be deteriorated.

Accordingly, in order to increase the number of shift-stages of the automatic transmission, a double row structure in which the planetary gear set is disposed on the planetary gear set is recently adopted, or a dog clutch instead of a wet control element is recently applied, but in this case, we have discovered that there is a problem that an applicable structure is limited, and deterioration of shift sensitivity is involved due to the application of the dog clutch.

The above information disclosed in this Background section is only for enhancement of understanding of the background of the present disclosure and therefore it may contain information that does not form the prior art that is already known to a person of ordinary skill in the art.

SUMMARY

The present disclosure provides a planetary gear train of an automatic transmission for a vehicle having advantages of improving power delivery performance and fuel economy by achieving at least ten forward speed stages and one reverse speed stage.

A planetary gear train of an automatic transmission for a vehicle in one exemplary form of the present disclosure may include: an input shaft configured to receive torque from an engine; an output shaft configured to output torque; a first planetary gear set including first, second, and third rotation elements; a second planetary gear set including fourth, fifth, and sixth rotation elements; a third planetary gear set including seventh, eighth, and ninth rotation elements; a fourth planetary gear set including tenth, eleventh, and twelfth rotational elements; a first shaft connected to a first rotational element and a tenth rotational element; a second shaft connected to the second rotational element, the fifth rotational element and the input shaft; a third shaft connected to the third rotational element; a fourth shaft connected to the fourth rotational element and the twelfth rotational element; a fifth shaft connected to the sixth rotational element and the seventh rotational element; a sixth shaft connected to the eighth rotational element and configured to be selectively connected to the fourth shaft and the fifth shaft; a seventh shaft connected to the ninth rotational element and configured to be selectively connected to the first shaft; and an eighth shaft connected to the eleventh rotational element and the output shaft, and configured to be selectively connected to the seventh shaft.

Each of the first shaft and the third shaft may be selectively connected to a transmission housing.

The first, second, and third rotation elements of the first planetary gear set may be a first sun gear, a first planet carrier, and a first ring gear, and the fourth, fifth, and sixth rotation elements of the second planetary gear set may be a second sun gear, a second planet carrier, and a second ring gear, respectively. The seventh, eighth, and ninth rotation elements of the third planetary gear set may be a third sun gear, a third planet carrier, and a third ring gear, and the tenth, eleventh, and twelfth rotation elements of the fourth planetary gear set may be a fourth sun gear, a fourth planet carrier, and a fourth ring gear, respectively.

The first, the second, the third, and the fourth planetary gear sets may be disposed in a sequence of the first, the second, the third, and the fourth planetary gear sets from the engine.

The planetary gear train may further include a first clutch configured to selectively connect the seventh shaft to the eighth shaft, a second clutch configured to selectively connect the first shaft to the seventh shaft, a third clutch configured to selectively connect the fourth shaft to the sixth shaft, a fourth clutch configured to selectively connect the fifth shaft to the sixth shaft, a first brake configured to selectively connect the first shaft to the transmission housing, and a second brake configured to selectively connect the third shaft to the transmission housing.

A planetary gear train of an automatic transmission for a vehicle in another form of the present disclosure may include: an input shaft configured to receive torque from an engine; an output shaft configured to output torque; a first planetary gear set including first, second, and third rotation elements; a second planetary gear set including fourth, fifth, and sixth rotation elements; a third planetary gear set including seventh, eighth, and ninth rotation elements; and a fourth planetary gear set including tenth, eleventh, and twelfth rotation elements. In particular, the input shaft is connected to the second rotational element, the output shaft is connected to the eleventh rotational element, the first rotational element is connected to the tenth rotational element, the second rotational element is connected to the fifth rotational element, the fourth rotational element is connected to the twelfth rotational element, the sixth rotational element is connected to the seventh rotational element, the eighth rotational element is configured to be selectively connected to the fourth and the sixth rotational elements, and the ninth rotational element is configured to be selectively connected to first and eleventh rotational elements.

Each of the first shaft and the third shaft may be selectively connected to a transmission housing.

The first, second, and third rotation elements of the first planetary gear set may be a first sun gear, a first planet carrier, and a first ring gear, and the fourth, fifth, and sixth rotation elements of the second planetary gear set may be a second sun gear, a second planet carrier, and a second ring gear, respectively. The seventh, eighth, and ninth rotation elements of the third planetary gear set may be a third sun gear, a third planet carrier, and a third ring gear, and the tenth, eleventh, and twelfth rotation elements of the fourth planetary gear set may be a fourth sun gear, a fourth planet carrier, and a fourth ring gear, respectively.

The first, the second, the third, and the fourth planetary gear sets may be disposed in a sequence of the first, the second, the third, and the fourth planetary gear sets from the engine.

The planetary gear train may further include: a first clutch configured to selectively connect the ninth rotational element to the eleventh rotational element; a second clutch configured to selectively connect the first rotational element to the ninth rotational element; a third clutch configured to selectively connect the fourth rotational element to the eighth rotational element; a fourth clutch configured to selectively connect the sixth rotational element to the eighth rotational element; a first brake configured to selectively connect the first rotational element to the transmission housing; and a second brake configured to selectively connect the third rotational element to the transmission housing.

The planetary gear train in the exemplary form of the present disclosure may achieve ten forward speed stages and one reverse speed stage by combining four planetary gear sets, which may be a simple planetary gear set, with six control elements.

In addition, the planetary gear train in the exemplary form of the present disclosure may achieve speed stages suitable to a rotational speed of the engine due to multiple-speed stages of the automatic transmission. Particularly, silent driving of the vehicle may be improved by using operation point positioned at a low rotational speed region of an engine. In addition, the planetary gear train in the exemplary form of the present disclosure may increase driving efficiency of the engine and may improve power delivery performance and fuel consumption.

Other effects obtainable or predictable from the exemplary forms of the present disclosure will be explicitly or implicitly described in the following description.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 1 is a schematic diagram of a planetary gear train in one exemplary form of the present disclosure; and FIG. 2 is an operation chart of control elements at each speed stage in the planetary gear train in one form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Hereinafter, an exemplary form of the present disclosure will be described in detail with reference to the accompanying drawings.

However, parts which are not related with the description are omitted for clearly describing the exemplary forms of the present disclosure and like reference numerals refer to like or similar elements throughout the specification.

In the following description, dividing names of components into first, second, and the like is to divide the names because the names of the components are the same as each other and an order thereof is not particularly limited.

FIG. 1 is a schematic diagram of a planetary gear train in one exemplary form of the present disclosure.

Referring to FIG. 1, a planetary gear train includes: first, second, third, and fourth planetary gear sets PG1, PG2, PG3, and PG4 disposed on the same axis; an input shaft IS; an output shaft OS; eight rotation shafts TM1 to TM8 connected to at least one of rotation elements of the first, second, third, and fourth planetary gear sets PG1, PG2, PG3, and PG4; four clutches C1 to C4 and two brakes B1 and B2 that are control elements; and a transmission housing H.

Torque input from the input shaft IS is changed by cooperation of the first, second, third, and fourth planetary gear sets PG1, PG2, PG3, and PG4, and the changed torque is output through the output shaft OS.

The planetary gear sets are disposed in the order of first, second, third and fourth planetary gear sets PG1, PG2, PG3 and PG4 from an engine side.

The input shaft IS is an input member and the torque from a crankshaft of an engine, after being torque-converted through a torque converter, is input into the input shaft IS.

The output shaft OS is an output member, is disposed in parallel with the input shaft IS, and transmits driving torque to a driving wheel through a differential apparatus.

The first planetary gear set PG1 is a single pinion planetary gear set and includes: a first sun gear S1, a first planet carrier PC1 rotatably supporting a first pinion P1 that is externally meshed with the first sun gear S1, and a first ring gear R1 that is internally meshed with the first pinion P1 respectively as first, second, and third rotation elements N1, N2, and N3.

The second planetary gear set PG2 is a single pinion planetary gear set and includes: a second sun gear S2, a second planet carrier PC2 rotatably supporting a second pinion P2 that is externally meshed with the second sun gear S2, and a second ring gear R2 that is internally meshed with the second pinion P2 respectively as fourth, fifth, and sixth rotation elements N4, N5, and N6.

The third planetary gear set PG3 is a single pinion planetary gear set and includes: a third sun gear S3, a third planet carrier PC3 rotatably supporting a third pinion P3 that is externally meshed with the third sun gear S3, and a third ring gear R3 that is internally meshed with the third pinion P3 respectively as seventh, eighth, and ninth rotation elements N7, N8, and N9.

The fourth planetary gear set PG4 is a single pinion planetary gear set and includes: a fourth sun gear S4, a fourth planet carrier PC4 rotatably supporting a fourth pinion P4 that is externally meshed with the fourth sun gear S4, and a fourth ring gear R4 that is internally meshed with the fourth pinion P4 respectively as tenth, eleventh, and twelfth rotation elements N10, N11, and N12.

The first rotational element N1 and the tenth rotational element N10 are directly connected to each other, the second rotational element N2 and the fifth rotational element N5 are directly connected to each other, the fourth rotational element N4 and the twelfth rotational element N12 are directly connected to each other, and the sixth rotational element N6 and the seventh rotational element N7 are directly connected to each other such that the first, the second, the third and the fourth planetary gear sets PG1, PG2, PG3 and PG4 include eight shafts TM1 to TM8.

The eight shafts TM1 to TM8 will be described in further detail.

The eight shafts TM1 to TM8 may be rotation members that directly connect a plurality of rotational elements among the rotational elements of the planetary gear sets PG1, PG2, PG3, and PG4 with each other or that are directly connected to any one rotation element of the planetary gear sets PG1, PG2, PG3, and PG4 and rotate with the any one rotation element to transmit torque, or may be fixed members that selectively or directly connect any one rotation element of the planetary gear sets PG1, PG2, PG3, and PG4 to the transmission housing H to fix the any one rotation element.

The first shaft TM1 is directly connected to the first rotational element N1 (the first sun gear S1) and the tenth rotational element N10 (the fourth sun gear S4) and is selectively connected to the transmission housing H to be operated as a selective fixed element.

The second shaft TM2 is directly connected to the second rotational element N2 (the first planet carrier PC1) and the fifth rotational element N5 (the second planet carrier PC2) and is directly connected to the input shaft IS.

The third shaft TM3 is directly connected to third rotational element N3 (the first ring gear R1) and is selectively connected to the transmission housing H to be operated as a selective fixed element.

The fourth shaft TM4 is directly connected to the fourth rotational element N4 (the second sun gear S2) and the twelfth rotational element N12 (the fourth ring gear R4).

The fifth shaft TM5 is directly connected to the sixth rotational element N6 (the second ring gear R2) and the seventh rotational element N7 (the third sun gear S3).

The sixth shaft TM6 is directly connected to the eighth rotational element N8 (the third planet carrier PC3) and is selectively connected to the fourth shaft TM4 and the fifth shaft TM5.

The seventh shaft TM7 is directly connected to the ninth rotational element N9 (the third ring gear R3) and is selectively connected to the first shaft TM1.

The eighth shaft TM8 is directly connected to the eleventh rotational element N11 (the fourth planet carrier PC4) and the output shaft OS and is selectively connected to the seventh shaft TM7.

In addition, four clutches C1, C2, C3, and C4 are disposed at portions at which any two shafts among the eight shafts TM1 to TM8 including the input shaft IS and the output shaft OS are selectively connected to each other.

In addition, two brakes B1 and B2 are disposed at portions at which any one shaft among the eight shafts TM1 to TM8 is selectively connected to the transmission housing H.

Arrangements of the four clutches C1 to C4 and the two brakes B1 and B2 are described in detail.

The first clutch C1 is disposed between the seventh shaft TM7 and the eighth shaft TM8 and selectively connects the seventh shaft TM7 with the eighth shaft TM8.

The second clutch C2 is disposed between the first shaft TM1 and the seventh shaft TM7 and selectively connects the first shaft TM1 with the seventh shaft TM7.

The third clutch C3 is disposed between the fourth shaft TM4 and the sixth shaft TM6 and selectively connects the fourth shaft TM4 with the sixth shaft TM6.

The fourth clutch C4 is disposed between the fifth shaft TM5 and the sixth shaft TM6 and selectively connects the fifth shaft TM5 with the sixth shaft TM6.

The first brake B1 is disposed between the first shaft TM1 and the transmission housing H and selectively connects the first shaft TM1 to the transmission housing H.

The second brake B2 is disposed between the third shaft TM3 and the transmission housing H and selectively connects third shaft TM3 to the transmission housing H.

The control elements including the first, the second, the third, and the fourth clutches C1, C2, C3, and C4 and the first and second brakes B1 and B2 may be frictionally engaging units that are operated by hydraulic pressure. Particularly, the control elements may be, but not limited to, multi-plates friction elements of wet type. However, the control elements may be engaging units that are operated by electrical signal, such as dog clutches, electric clutches, magnetic particle clutches, etc.

FIG. 2 is an operation chart of control elements at each speed stage in the planetary gear train in one exemplary form of the present disclosure.

As shown in FIG. 2, three control elements among the first, the second, the third, and the fourth clutches C1, C2, C3, and C4 and the first and the second brakes B1 and B2 that are control elements are operated at each speed stage in the planetary gear train.

The second and the third clutches C2 and C3 and the first brake B1 are simultaneously operated at a first forward speed shift-stage D1.

In a state that the first shaft TM1 is connected with the seventh shaft TM7 by operation of the second clutch C2 and the fourth shaft TM4 is connected with the sixth shaft TM6 by operation of the third clutch C3, torque of the input shaft IS is input to the second shaft TM2.

In addition, the first shaft TM1 is operated as the fixed element by operation of the first brake B1. Therefore, the torque of the input shaft IS is shifted into the first forward speed stage, and the first forward speed stage is output through the output shaft OS connected to the eighth shaft TM8.

The first and the third clutches C1 and C3 and the first brake B1 are simultaneously operated at a second forward speed shift-stage D2.

In a state that seventh shaft TM7 is connected with the eighth shaft TM8 by operation of the first clutch C1 and the fourth shaft TM4 is connected with the sixth shaft TM6 by operation of the third clutch C3, torque of the input shaft IS is input to the second shaft TM2.

In addition, the first shaft TM1 is operated as the fixed element by operation of the first brake B1. Therefore, the torque of the input shaft IS is shifted into the second forward speed stage, and the second forward speed stage is output through the output shaft OS connected to the eighth shaft TM8.

The third and the fourth clutches C3 and C4 and the first brake B1 are simultaneously operated at the third forward speed shift-stage D3.

In a state that the fourth shaft TM4 is connected with the sixth shaft TM6 by operation of the third clutch C3 and the fifth shaft TM5 is connected with the sixth shaft TM6 by operation of the fourth clutch C4, torque of the input shaft IS is input to the second shaft TM2.

In addition, the first shaft TM1 is operated as the fixed element by operation of the first brake B1. Therefore, the torque of the input shaft IS is shifted into the third forward speed stage, and the third forward speed stage is output through the output shaft OS connected to the eighth shaft TM8.

The first and the fourth clutches C1 and C4 and the first brake B1 are simultaneously operated at a fourth forward speed shift-stage D4.

In a state that the seventh shaft TM7 is connected with the eighth shaft TM8 by operation of the first clutch C1 and the fifth shaft TM5 is connected with the sixth shaft TM6 by operation of the fourth clutch C4, torque of the input shaft IS is input to the second shaft TM2.

In addition, the first shaft TM1 is operated as the fixed element by operation of the first brake B1. Therefore, the torque of the input shaft IS is shifted into the fourth forward speed stage, and the fourth forward speed stage is output through the output shaft OS connected to the eighth shaft TM8.

The first, the third and the fourth clutches C1, C3, and C4 are simultaneously operated at a fifth forward speed shift-stage D5.

In a state that the seventh shaft TM7 is connected with the eighth shaft TM8 by operation of the first clutch C1, the fourth shaft TM4 is connected with the sixth shaft TM6 by operation of the third clutch C3, and the fifth shaft TM5 is connected with the sixth shaft TM6 by operation of the fourth clutch C4, torque of the input shaft IS is input to the second shaft TM2.

In this case, the first, the second, the third, and the fourth planetary gear sets PG1, PG2, PG3, and PG4 become lock-up states. Therefore, the torque of the input shaft IS is shifted into the fifth forward speed stage, and the fifth forward speed stage is output through the output shaft OS connected to the seventh shaft TM8. At the fifth forward speed stage, rotation speed which is the same as rotation speed of the input shaft IS is output.

The first and the fourth clutches C1 and C4 and the second brake B2 are simultaneously operated at a sixth forward speed shift-stage D6.

In a state that the seventh shaft TM7 is connected with the eighth shaft TM8 by operation of the first clutch C1 and the fifth shaft TM5 is connected with the sixth shaft TM6 by operation of the fourth clutch C4, torque of the input shaft IS is input to the second shaft TM2.

In addition, the third shaft TM3 is operated as the fixed element by operation of the second brake B2. Therefore, the torque of the input shaft IS is shifted into the sixth forward speed stage, and the sixth forward speed stage is output through the output shaft OS connected to the eighth shaft TM8.

The third and the fourth clutches C3 and C4 and the second brake B2 are simultaneously operated at a seventh forward speed shift-stage D7.

In a state that the fourth shaft TM4 is connected with the sixth shaft TM6 by operation of the third clutch C3 and the fifth shaft TM5 is connected with the sixth shaft TM6 by operation of the fourth clutch C4, torque of the input shaft IS is input to the second shaft TM2.

In addition, the third shaft TM3 is operated as the fixed element by operation of the second brake B2. Therefore, the torque of the input shaft IS is shifted into the seventh forward speed stage, and the seventh forward speed stage is output through the output shaft OS connected to the eighth shaft TM8.

The first and the third clutches C1 and C3 and the second brake B2 are simultaneously operated at eighth forward speed shift-stage D8.

In a state that the seventh shaft TM7 is connected with the eighth shaft TM8 by operation of the first clutch C1 and the fourth shaft TM4 is connected with the sixth shaft TM6 by operation of the third clutch C3, torque of the input shaft IS is input to the second shaft TM2.

In addition, the third shaft TM3 is operated as the fixed element by operation of the second brake B2. Therefore, the torque of the input shaft IS is shifted into the eighth forward speed stage, and the eighth forward speed stage is output through the output shaft OS connected to the eighth shaft TM8.

The second and the third clutches C2 and C3 and the second brake B2 are simultaneously operated at a ninth forward speed shift-stage D9.

In a state that the first shaft TM1 is connected with the seventh shaft TM7 by operation of the second clutch C2 and the fourth shaft TM4 is connected with the sixth shaft TM6 by operation of the third clutch C3, torque of the input shaft IS is input to the second shaft TM2.

In addition, the third shaft TM3 is operated as the fixed element by operation of the second brake B2. Therefore, the torque of the input shaft IS is shifted into the ninth forward speed stage, and the ninth forward speed stage is output through the output shaft OS connected to the eighth shaft TM8.

The first, the second clutches C1 and C2 and the second brake B2 are simultaneously operated at a tenth forward speed shift-stage D10.

In a state that the seventh shaft TM7 is connected with the eighth shaft TM8 by operation of the first clutch C1 and the first shaft TM1 is connected with the seventh shaft TM7 by operation of the second clutch C2, torque of the input shaft IS is input to the second shaft TM2.

In addition, the third shaft TM3 is operated as the fixed element by operation of the second brake B2. Therefore, the torque of the input shaft IS is shifted into the tenth forward speed stage, and the tenth forward speed stage is output through the output shaft OS connected to the eighth shaft TM8.

The second and the fourth clutches C2 and C4 and the second brake B2 are simultaneously operated at a reverse speed REV.

In a state that the first shaft TM1 is connected with the seventh shaft TM7 by operation of the second clutch C2 and the fifth shaft TM5 is connected with the sixth shaft TM6 by operation of the fourth clutch C4, torque of the input shaft IS is input to the second shaft TM2.

In addition, the third shaft TM3 is operated as the fixed element by operation of the second brake B2. Therefore, the torque of the input shaft IS is shifted into the reverse speed stage, and the reverse speed stage is output through the output shaft OS connected to the eighth shaft TM8 as inverse rotation speed.

The planetary gear trains according to the exemplary form of the present disclosure may achieve at least ten forward speed stages and one reverse speed stage by combining four planetary gear sets PG1, PG2, PG3, and PG4 with the four clutches C1, C2, C3, and C4 and the two brakes B1 and B2.

In addition, the planetary gear train according to the exemplary form of the present disclosure may achieve suitable speed stages according to rotation speed of the engine. Particularly, silent driving of the vehicle may be improved by using operation point positioned at a low rotational speed region of the engine.

In addition, the planetary gear train of the present disclosure may increase driving efficiency of the engine and may improve power delivery performance and fuel consumption.

While this present disclosure has been described in connection with what is presently considered to be practical exemplary forms, it is to be understood that the present disclosure is not limited to the disclosed forms, but, on the contrary, is intended to cover various modifications and equivalent arrangements included within the spirit and scope of the present disclosure.

DESCRIPTION OF SYMBOLS

B1, B2: first and second brakes
C1, C2, C3, C4: first, second, third and fourth clutches
PG1, PG2, PG3, PG4: first, second, third and fourth planetary gear sets
S1, S2, S3, S4: first, second, third and fourth sun gears
PC1, PC2, PC3, PC4: first, second, third and fourth planet carriers
R1, R2, R3, R4: first, second, third and fourth ring gears
IS: input shaft
OS: output shaft
TM1, TM2, TM3, TM4, TM5, TM6, TM7, TM8: first, second, third, fourth, fifth, sixth, seventh and eighth shafts

What is claimed is:

1. A planetary gear train of an automatic transmission for a vehicle, comprising:
    an input shaft configured to receive torque from an engine;
    an output shaft configured to output torque;
    a first planetary gear set including first, second, and third rotation elements;
    a second planetary gear set including fourth, fifth, and sixth rotation elements;
    a third planetary gear set including seventh, eighth, and ninth rotation elements;
    a fourth planetary gear set including tenth, eleventh, and twelfth rotational elements;
    a first shaft connected to the first rotational element and the tenth rotational element;
    a second shaft connected to the second rotational element, the fifth rotational element and the input shaft;
    a third shaft connected to the third rotational element;
    a fourth shaft connected to the fourth rotational element and the twelfth rotational element;
    a fifth shaft connected to the sixth rotational element and the seventh rotational element;
    a sixth shaft connected to the eighth rotational element and configured to be selectively connected to the fourth shaft and the fifth shaft;
    a seventh shaft connected to the ninth rotational element and configured to be selectively connected to the first shaft; and
    an eighth shaft connected to the eleventh rotational element and the output shaft, and configured to be selectively connected to the seventh shaft.

2. The planetary gear train of claim 1, wherein each of the first shaft and the third shaft is configured to be selectively connected to a transmission housing.

3. The planetary gear train of claim 1, wherein
    the first, second, and third rotation elements of the first planetary gear set are a first sun gear, a first planet carrier, and a first ring gear;
    the fourth, fifth, and sixth rotation elements of the second planetary gear set are a second sun gear, a second planet carrier, and a second ring gear;
    the seventh, eighth, and ninth rotation elements of the third planetary gear set are a third sun gear, a third planet carrier, and a third ring gear; and
    the tenth, eleventh, and twelfth rotation elements of the fourth planetary gear set are a fourth sun gear, a fourth planet carrier, and a fourth ring gear, respectively.

4. The planetary gear train of claim 1, wherein the first, the second, the third, and the fourth planetary gear sets are disposed in a sequence of the first, the second, the third, and the fourth planetary gear sets from the engine.

5. The planetary gear train of claim 2, further comprising:
    a first clutch configured to selectively connect the seventh shaft to the eighth shaft;
    a second clutch configured to selectively connect the first shaft to the seventh shaft;
    a third clutch configured to selectively connect the fourth shaft to the sixth shaft;
    a fourth clutch configured to selectively connect the fifth shaft to the sixth shaft;
    a first brake configured to selectively connect the first shaft to the transmission housing; and
    a second brake configured to selectively connect the third shaft to the transmission housing.

6. A planetary gear train of an automatic transmission for a vehicle, comprising:
    an input shaft configured to receive torque from an engine;
    an output shaft configured to output torque;
    a first planetary gear set including first, second, and third rotation elements;
    a second planetary gear set including fourth, fifth, and sixth rotation elements;
    a third planetary gear set including seventh, eighth, and ninth rotation elements; and
    a fourth planetary gear set including tenth, eleventh, and twelfth rotation elements,
    wherein the input shaft is connected to the second rotational element,
    the output shaft is connected to the eleventh rotational element,
    the first rotational element is connected to the tenth rotational element,
    the second rotational element is connected to the fifth rotational element,
    the fourth rotational element is connected to the twelfth rotational element,
    the sixth rotational element is connected to the seventh rotational element,
    the eighth rotational element is selectively connected to the fourth and sixth rotational elements, and
    the ninth rotational element is selectively connected to the first and eleventh rotational elements.

7. The planetary gear train of claim 6, wherein each of the first rotational element and the third rotational element is configured to be selectively connected to a transmission housing.

8. The planetary gear train of claim 6, wherein
the first, second, and third rotation elements of the first planetary gear set are a first sun gear, a first planet carrier, and a first ring gear;
the fourth, fifth, and sixth rotation elements of the second planetary gear set are a second sun gear, a second planet carrier, and a second ring gear;
the seventh, eighth, and ninth rotation elements of the third planetary gear set are a third sun gear, a third planet carrier, and a third ring gear; and
the tenth, eleventh, and twelfth rotation elements of the fourth planetary gear set are a fourth sun gear, a fourth planet carrier, and a fourth ring gear, respectively.

9. The planetary gear train of claim 6, wherein the first, the second, the third, and the fourth planetary gear sets are disposed in a sequence of the first, the second, the third, and the fourth planetary gear sets from the engine.

10. The planetary gear train of claim 7, further comprising:
a first clutch configured to selectively connect the ninth rotational element to the eleventh rotational element;
a second clutch configured to selectively connect the first rotational element to the ninth rotational element;
a third clutch configured to selectively connect the fourth rotational element to the eighth rotational element;
a fourth clutch configured to selectively connect the sixth rotational element to the eighth rotational element;
a first brake configured to selectively connect the first rotational element to the transmission housing; and
a second brake configured to selectively connect the third rotational element to the transmission housing.

* * * * *